(12) United States Patent
Yamamoto (10) Patent No.: US 7,868,943 B2
(45) Date of Patent: Jan. 11, 2011

(54) IMAGE PICKUP APPARATUS AND INTERCHANGEABLE LENS

(75) Inventor: Yuji Yamamoto, Kasukabe (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/131,520

(22) Filed: Jun. 2, 2008

(65) Prior Publication Data
US 2008/0303923 A1 Dec. 11, 2008

(30) Foreign Application Priority Data
Jun. 6, 2007 (JP) .............................. 2007-150815

(51) Int. Cl.
*G03B 13/00* (2006.01)
(52) U.S. Cl. .......................... 348/345; 348/335; 396/91; 396/374
(58) Field of Classification Search ........................ None
See application file for complete search history.

(56) References Cited

U.S. PATENT DOCUMENTS 5,255,043 A * 10/1993 Kawasaki ..................... 396/78
5,274,416 A * 12/1993 Kawasaki et al. ............. 396/91
5,325,145 A * 6/1994 Hirasawa ....................... 396/81
5,946,504 A * 8/1999 Hirasawa et al. ............. 396/80
6,941,068 B2 * 9/2005 Matsuda ........................ 396/91

FOREIGN PATENT DOCUMENTS

JP       02-065474     3/1990
JP       2000-050141   2/2000

* cited by examiner

*Primary Examiner*—David L Ometz
*Assistant Examiner*—Angel L Garces-Rivera
(74) *Attorney, Agent, or Firm*—Cowan, Liebowitz & Latman, P.C.

(57) ABSTRACT

An image pickup apparatus 100 includes a memory 52 that stores information on an object distance obtained from an interchangeable lens 220 mounted on the image pickup apparatus and a memory controller 50 that retains the information on the object distance in the memory also after the interchangeable lens is removed from the image pickup apparatus. The image pickup apparatus of a changing-lenses type in which an object in-focus at a same distance can be obtained in a short time when lenses are changed is provided.

4 Claims, 4 Drawing Sheets

IMAGE PICKUP APPARATUS AND INTERCHANGEABLE LENS

BACKGROUND OF THE INVENTION

The present invention relates to an image pickup apparatus capable of changing lenses and an interchangeable lens to be detachably mounted thereon.

As disclosed in Japanese Patent Laid-Open No. 2-65474, many image pickup apparatuses capable of changing lenses such as single-lens reflex digital cameras and video cameras perform focus control based on a focus evaluation signal showing a contrast state of an image obtained using an image pickup devise such as a charge-coupled device (CCD) sensor. Such a method for controlling focus is referred to as a contrast detection method.

Further, many image pickup apparatus mount a, so called, live view display function for displaying a picked up image in a substantially real time on a display. Japanese Patent Laid-Open No. 2000-50141 discloses an image pickup apparatus that starts the live display view function after controlling a focus for obtaining an image somewhat in focus at an object distance from a distant view to a close view after a power is turned on.

Generally, focus control by a contrast detection method searches a position at which a focus evaluation signal extracted from a picked up image is largest while a focus lens is moved. Thus, it takes time to obtain an image in focus, compared to that by a phase difference detection method.

Therefore, for example, when changing lenses with a structure for picking up an image determined using a tripod, it is necessary to wait until the image in-focus is obtained to start picking up the image to perform all over again the focus control by the contrast detection method from the beginning.

Unlike the image pickup apparatus as disclosed in Japanese Patent Laid-Open No. 2000-50141, it is difficult for an image pickup apparatus of a changing-lenses type on which various lenses are to be mounted to perform the focus control for picking up an image somewhat in focus at an object distance from the distance view to the close view.

BRIEF SUMMARY OF THE INVENTION

The present invention provides an image pickup apparatus of a changing-lenses type in which an object in-focus at a same distance can be obtained in a short time when lenses are changed, and an interchangeable lens to be mounted on the image pickup apparatus.

An image pickup apparatus as one aspect of the present invention includes a memory that stores information on an object distance obtained from an interchangeable lens mounted on the image pickup apparatus, a memory controller that retains the information on the object distance in the memory also after the interchangeable lens is removed from the image pickup apparatus, a focus controller that makes a second interchangeable lens operate in a direction of a lens position corresponding to the information on the object distance of the first interchangeable lens retained in the memory when the second interchangeable lens is mounted on the image pickup apparatus in a case where the information on the object distance of the first interchangeable lens is retained in the memory, and an image pickup device that photoelectrically converts an object image formed by one of the first and the second interchangeable lenses. The focus controller performs a focus control on one of the first and the second interchangeable lenses based on a focus evaluation signal showing a contrast status of an image obtained using the image pickup device, and performs the focus control after making the second interchangeable lens operate in the direction of the lens position corresponding to the information on the object distance of the first interchangeable lens retained in the memory when the second interchangeable lens is mounted on the image pickup apparatus in the case where the information on the object distance of the first interchangeable lens is retained in the memory.

An interchangeable lens as another aspect of the present invention is an interchangeable lens that is detachably mounted on the image pickup apparatus. The interchangeable lens includes a detector that detects a lens position and an information generator that generates information on an object distance based on the detected lens position to output the information to the image pickup apparatus.

Further, a method for controlling an image pickup apparatus as another aspect of the present invention includes steps of storing information on an object distance of an interchangeable lens mounted thereon in a memory, retaining the information on the object distance in the memory also after the interchangeable lens is removed from the image pickup apparatus, making a second interchangeable lens operate in a direction of a lens position corresponding to the information on the object distance of the first interchangeable lens retained in the memory by a focus controller when the second interchangeable lens is mounted on the image pickup apparatus in a case where the information on the object distance of the first interchangeable lens is retained in the memory, and photoelectrically converting an object image formed by one of the first and the second interchangeable lenses. The focus controller performs a focus control on one of the first and the second interchangeable lenses based on a focus evaluation signal showing a contrast status of an image obtained using the image pickup device, and performs the focus control after making the second interchangeable lens operate in the direction of the lens position corresponding to the information on the object distance of the first interchangeable lens retained in the memory when the second interchangeable lens is mounted on the image pickup apparatus in the case where the information on the object distance of the first interchangeable lens is retained in the memory.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 1:
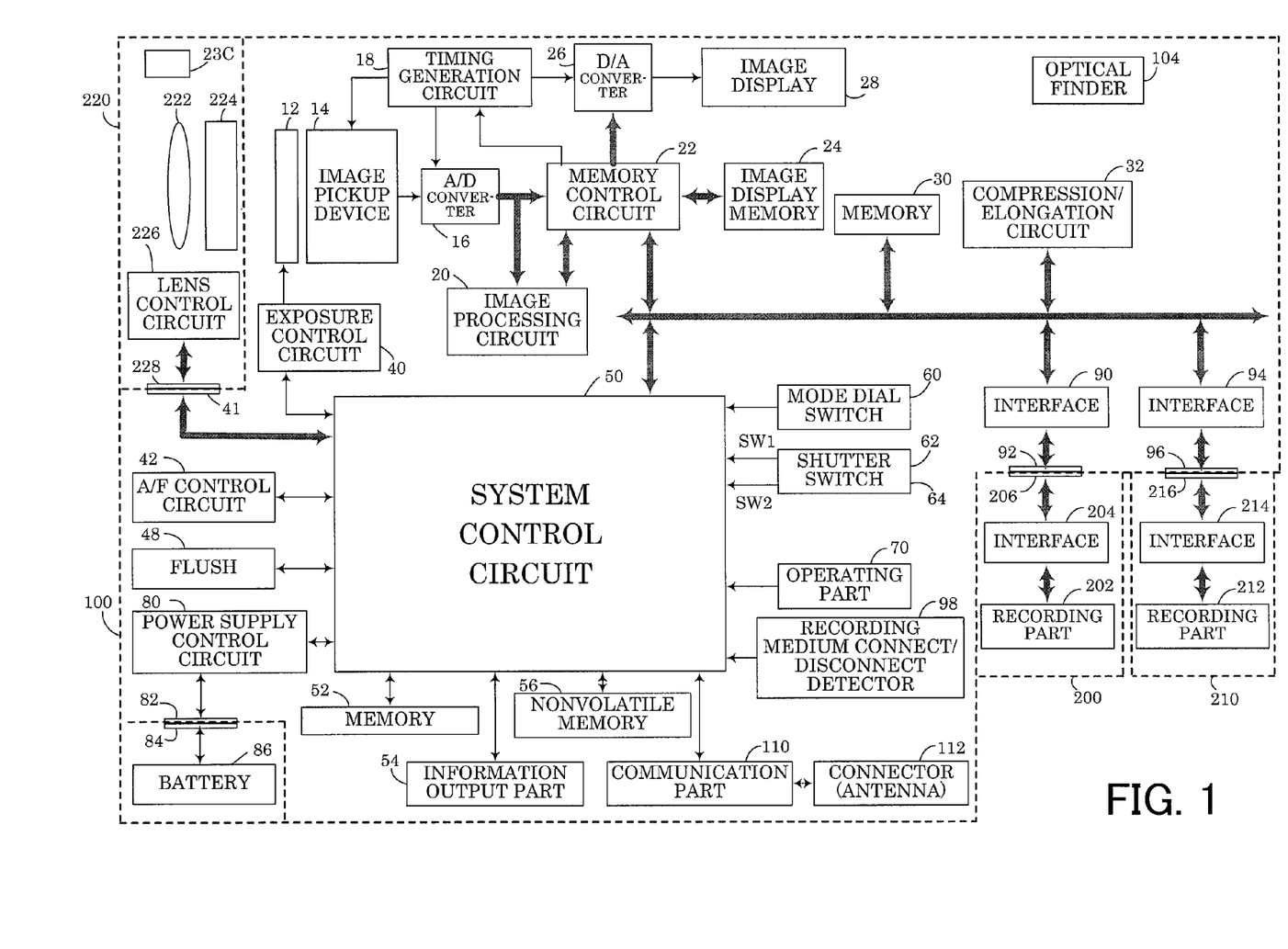
FIG. 1 is a block diagram showing the configuration of a camera system configured by an image pickup apparatus and an interchangeable lens according to an embodiment of the present invention.

FIG. 1 shows the configuration of an image pickup system including a single-lens reflex digital camera and an interchangeable lens as the image pickup system according to the embodiment of the present invention respectively.

In FIG. 1, reference numeral 100 denotes a single-lens reflex digital camera (hereinafter referred to as a "camera") and reference numeral 220 denotes an interchangeable lens that is detachably mounted thereon.

In the camera 100, reference numeral 12 denotes a shutter for controlling an exposure light amount of the image pickup device that will be described later.

Reference numeral 14 denotes an image pickup device that includes a CCD sensor or a complementary metal oxide semiconductor (CMOS) sensor, for example. The image pickup device 14 photoelectrically converts an object image formed by the interchangeable lens 220.

Reference numeral 16 denotes an A/D converter that converts an analog image pickup signal from the image pickup device 14 into a digital signal.

Reference numeral 18 denotes a timing generation circuit that supplies a clock signal to the image pickup device 14, the A/D converter 16, and a D/A converter 26 that will be described later. A memory control circuit 22 and a system control circuit 50 that will be described later controls the timing generation circuit 18.

Reference numeral 20 denotes an image processing circuit that performs various image processings such as pixel interpolation processing, color conversion processing and auto white balance (AWB) processing on a digital image pickup signal from the A/D converter 16 or the memory control circuit 22, thereby generating an image signal (image). The image processing circuit 20 further performs a predetermined arithmetic processing using the image signal.

The system control circuit 50 controls an overall operation of the camera 100 and an operation of the interchangeable lens 220. The system control circuit 50 has a function as a memory controller and a display controller, and also as a focus controller as well as an A/F control circuit 42. The system control circuit 50 controls, based on a result of a predetermined arithmetic operation performed using the image signal, an interchangeable lens 220 via a communication contact point 41 as well as an exposure control circuit 40 that will be described later and the AF control circuit 42.

The memory control circuit 22 controls the A/D converter 16, the timing generation circuit 18, the image processing circuit 20, and an image display memory 24, a D/A converter 26, a memory 30 and a compression/elongation circuit 32 that will be described later.

The image signal from the image processing circuit 20 or the digital image pickup signal from the A/D converter 16 is written into the image display memory 24 or the memory 30 via the memory control circuit 22.

Reference numeral 28 denotes an image display (display unit) that is configured by a liquid crystal display (LCD) and the like. An image data for a display written into the image display memory 24 is sent to the image display 28 via the D/A converter 26 and is displayed on the image display 28.

The image data for a display generated by the image processing circuit 20 and written into the image display memory 24 is sequentially displayed on the image display 28 with the shutter 12 opened, thereby realizing the electronic finder function. As described above, displaying an object image (image data) via the electronic finder is referred to as a live view display.

Further, the image display 28 can be turned on and off according to instructions from the system control circuit 50.

The memory 30 stores a static image and a dynamic image that have been generated. The memory 30 is also used as a work area of the system control circuit 50.

Reference numeral 32 denotes a compression/elongation circuit that compresses and/or elongates the image data by an adoptive discrete cosine transformation (ADCT) and the like. The compression/elongation circuit 32 reads the image stored in the memory 30 to perform compression processing or elongation processing, and then write the data on which processing has been completed into the memory 30 again.

Reference numeral 40 denotes an exposure control circuit that controls the shutter 12 and also controls a diaphragm 224 of the interchangeable lens 220 via the system control circuit 50. Further, the exposure control circuit 40 controls a flash operation of a flash 48 via the system control circuit 50.

The AF control circuit 42 performs the focus control of the interchangeable lens 220 by the contrast detection method via the system control circuit 50. More specifically, while moving a focus lens at each predetermined amount in an optical axis direction, the AF control circuit 42 extracts a high-frequency component from the image signal (image) generated by the image processing circuit 20, and generates an AF evaluation value signal (a focus evaluation signal). Then, the AF control circuits 42 determines a focus position where the AF evaluation value signal is largest, and move or stop the focus lens thereat as an in-focus position.

Reference numeral 52 denotes a memory that stores data including a constant, a variable and a computer program of the system control circuit 50.

Reference numeral 54 denotes an information output part that outputs information showing an operation status and a message of the camera 100 using letters, images, audio and the like. The information output part 54 includes a liquid crystal display device, a speaker and the like. The information output part 54 displays a part of the information in a finder screen via a finder optical system.

Reference numeral 56 denotes a nonvolatile memory that is electrically erasable and recordable, and an electrically erasable programmable read-only memory (EEPROM) or the like is used.

Reference numeral 60 denotes a mode dial switch that is operated to set for switching each of functions such as a power ON/OFF, an image pickup mode (static-image pickup mode or moving-image pickup mode), a play mode, and the like.

Reference numeral 62 denotes an image pickup setup switch (SW1) that is turned on by a first stroke operation (half pressing) of a shutter button (not shown) to start an image pickup setup operation such as photometry (automatic exposure (AE) processing), AF processing and the like.

Reference numeral 64 denotes an image pickup start switch (SW2) that is turned on by a second stroke operation (fully pressed) of the shutter button to start an image pickup operation.

An image pickup operation referred to herein includes operations for opening and closing the shutter 12, generating an image signal in the image processing circuit 20 based on an image pickup signal from the image pickup device 14, and writing the image signal into the memory 30 via the memory control circuit 22. The image pickup operation further includes operations for reading the image data from the memory 30, compressing it by the compression/elongation circuit 32, and recording it in the recording media 200 and 210 that will be described later. The sequential image pickup operations can also be referred to as an obtaining operation of the image for recording. The recording media 200 and 210 include a semiconductor memory, an optical disc or the like.

Reference numeral 70 denotes an operating part including various buttons, touch panels and the like. The operating part 70 is operated for displaying a menu screen for performing a function selection and various settings of the camera 100, and determining a menu item.

Reference numeral 80 denotes a power supply control circuit that includes a battery detecting circuit for detecting a remaining amount of battery, a DC-CD converter for converting a power supply voltage from the battery into a predetermined operation voltage, a switch circuit for switching blocks through which a current pass, and the like.

Reference numeral 86 denotes a battery. As the battery 86, a first battery such as an alkaline battery and a lithium battery and a second battery such as an NiMH battery and an Li battery are used. Reference numerals 82 and 84 denote connectors that electrically connect the battery 86 and the camera 100.

Reference numerals 90 and 94 denote interfaces that communicate with the recording media 200 and 210 respectively. Reference numerals 92 and 96 denote connectors that are connected to the recording media 200 and 210 respectively. Reference numeral 98 denotes a recording medium connect/disconnect detector that detects whether or not the recording media 200 and 210 are mounted on the connectors 92 and 96.

Reference numeral 110 denotes a communication part that includes a communication function such as RS232C, USB, IEEE1394, wireless communication and the like.

Reference numeral 112 denotes a connector that connects other devices to the camera 100 via the communication part 110, and an antenna for wireless communication.

The recording media 200 and 210 include interfaces 204 and 214 for communicating with the camera 100 and connectors 206 and 216 for electrically connecting the camera 100. A compressed image data to be output from the camera 100 is written into recording parts 202 and 212.

In the interchangeable lens 220, reference numeral 222 denotes a group of image pick up lenses that includes a plurality of lenses such as a focus lens for moving in an optical axis direction to adjust focus and a zoom lens for moving in the same to perform zooming. Reference numeral 224 denotes a diaphragm that adjusts an amount of light reaching the image pickup device 14. An image pickup optical system includes the group of image pickup lenses 222 and the diaphragm 224.

Reference numeral 226 denotes a lens control circuit that controls an actuator (not shown) for driving the focus lens, the zoom lens, and the diaphragm 224 according to a control signal from the system control circuit 50. Reference numeral 228 denotes a connector 228 that is connected to the communication contact point 41 in the camera 100 to enable communication between the lens control circuit 226 and the system control circuit 50. Further, the connector 228 supplies a power supply voltage from the battery 86 into the interchangeable lens 220.

Reference numeral 230 denotes an object distance detector (information generator) that acquires an object distance based on an encoder for detecting positions of the focus lens and a zoom lens and an output from the encoder. That is, the object distance detector generates information on the object distance.

The object distance referred to in the present embodiment is the distance at which the image pickup optical system becomes in focus according to the positions of the focus lens and a zoom lens, and the object distance means an absolute distance (for example, 1 meter or 3 meters). The object distance can be acquired by substituting a position of each lens detected by the encoder into a predetermined arithmetic expression, or by reading the object distance corresponding to a position of each lens from a table data of the focus lens.

A lens control circuit 226 sends (outputs) information showing the current object distance acquired by an object distance detector 230. In explanation described below, information showing an object distance is referred to as object distance information.

Further, the lens control circuit 226 sends also information such as an object distance range (between shortest object distance and longest object distance) of the interchangeable lens 220, a zooming position, a diaphragm position and the like to the system control circuit 50. The shortest object distance is minimum object distance (MOD) at which the image pickup optical system can be in focus, and the longest object distance is maximum distance (infinity) at which the image pickup optical system can be in focus.

Next, with reference to FIGS. 1 to 4, the operation of the camera 100 (the system control circuit 50 and the AF control circuit 42) will be described. The operation is executed according to a computer program stored in the memory 52.

Figure 2:
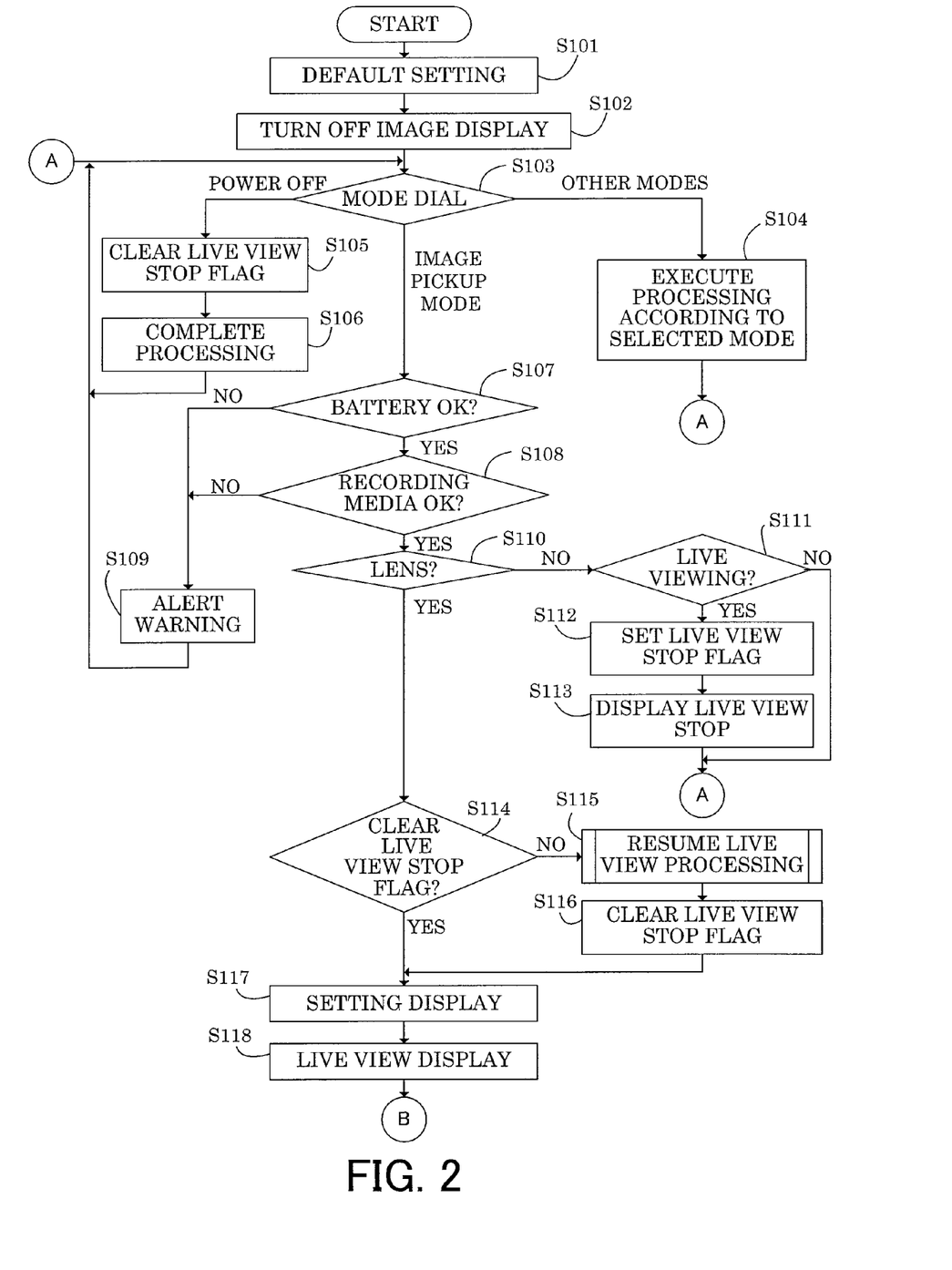
FIG. 2 is a flowchart showing an operation of the image pickup apparatus of the present embodiment.
Figure 3:
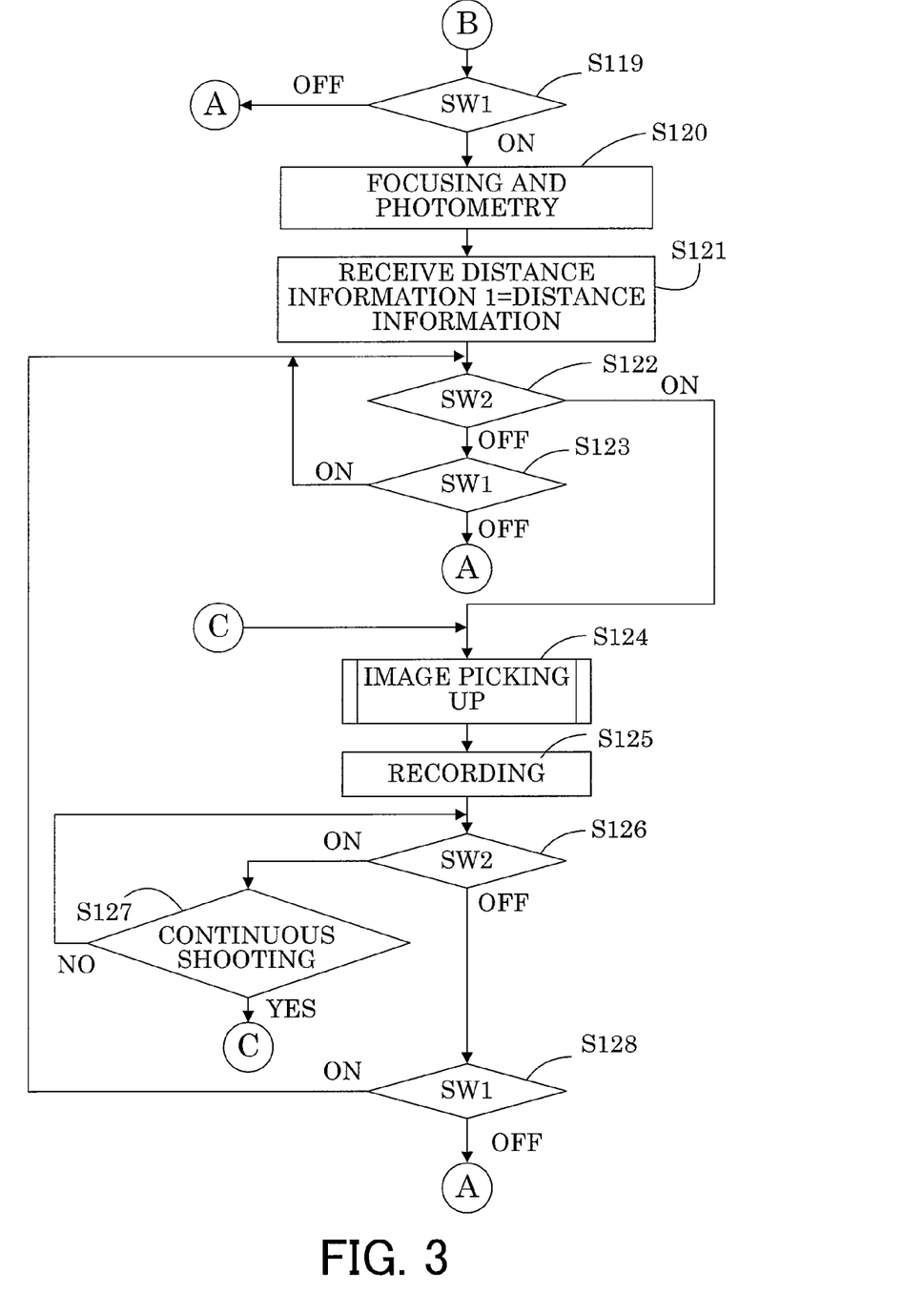
FIG. 3 is a flowchart showing the operation (continued from FIG. 2) of the image pickup apparatus of the embodiment.

First, with reference to FIGS. 2 and 3, a main routine operation of the camera 100 will be described.

When the power of the camera is turned on, the system control circuit 50 formats a flag, a control variable, and the like in step S101 to set an image display of the image display 28 to turn off by default in step S102.

The system control circuit 50 determines a setting of a mode dial 60 in step 103, and when a power of the mode dial 60 is set to off, a flag for stopping the live view display is cleared in step S105. The system control circuit 50 performs necessary processing for completing the operation of the camera 100 in step 106, and then returns to step S103.

When the mode dial 60 is set to the image picking up mode in step S103, the process proceeds to step S107. When the mode dial 60 is set to other mode, the system control circuit 50 executes processing according to the selected mode in step S104, and returns to step S103 when completing the processing.

In step S107, the system control circuit 50 determines whether or not a remaining level of the battery 86 is reduced, and whether or not the camera 100 has malfunctions with its operations using the power supply control circuit 80. When a problem is found, the process returns to step S103 after providing alert warning in step S109 through an information output part 54.

When no problem is found, the system control circuit 50 determines whether or not a problem occurs with an operating state of the recording media 200 and 210 while performing recording replay operation of the image data in step S108. When a problem occurs, a predetermined alert warning is provided through the information output portion 54 in step S109 to return to step S103.

When no problem is found in the recording media 200 and 210, the system control circuit 50 checks whether or not the interchangeable lens 220 is mounted by communicating with the interchangeable lens 220 in step S110. If the interchangeable lens 220 is not mounted, the system control circuit 50 checks whether or not the image display 28 is performing the live view display. If the live view is not being displayed, it returns to S103. If the live view is being displayed, a stop flag for the live view display is set in step S112 to turn off the image display 28 and the process returns to step S103.

The system control circuit 50 makes an internal memory of the system control circuit 50 or the memory 52 as a store unit store a status of the live view stop flag.

In step S110, on the other hand, when the interchangeable lens 220 is mounted, the system control circuit 50 checks the live view stop flag in step S114. When the live view stop flag is not cleared (is set), the system control circuit 50 performs resume processing on the live view display in step S115. Subsequently, it clears the live view stop flag in step S116.

When proceeding from step S114 to step S115, the following case is assumed. That is, the interchangeable lens 220 is removed (not mounted) in step S110, the live view display is stopped in steps S112 and S113. And that is, afterward, other interchangeable lens 220 is mounted in routine step S110. Resume processing of the live view display will be described later.

If the live view stop flag is cleared in step S114, various kinds of setting states of the camera 100 can be displayed through information output part 54 in step S117. When the image display 28 is turned on, various kinds of setting of the camera 100 can be displayed in the image display 28.

Next, the system control circuit 50 starts the live view display in the image display 28 in step S118, and proceeds to step S119. An image taker can determine a structure for obtaining an image for recording while observing the object image that is displayed as a live view, as an electronic finder image.

Next, the system control circuit 50 determines whether or not the image pickup setup switch SW1 is pressed (on), and returns to step S103 when not pressed (off). On the other hand, when the image pickup setup switch SW1 is on, the system control circuit 50 performs the AF processing as well as the AF control circuit 42 in step S120 to focus the object of the interchangeable lens 220. And, it also performs photometry processing to determine a diaphragm value and a shutter time. In the photometry processing, the operation of the flush 48 is set if necessary.

When completing the AE processing to stop the focus lens, the system control circuit 50 receives the object distance information from the interchangeable lens 220 in step S121. And the information is stored as "distance information 1" in the internal memory or the memory 52 as the store unit. The system control circuit 50 retains the distance information 1 in the internal memory or the memory 52 also after the interchangeable lens 220 is removed from the image pickup apparatus.

Next, in step S122, the system control circuit 50 determines whether or not the image pickup start switch SW2 is on. If it is off, it determines again whether or not the image setup switch SW 1 is on in step S123. When the image setup switch SW1 is off, it returns to step S103.

When the image pickup start switch SW2 is on, the system control circuit 50 performs a series of image pickup operations (exposure process and recording process) described above in steps S124 and S125. Then it returns to step S103.

When completing the image pickup operation, in step S126, the system control circuit 50 determines whether or not the image pickup start switch SW2 is on. When it is on, it checks the internal memory or the memory 52 to determine whether or not the action flag is set in step S127. When the action flag is set, the process returns to step S124 to perform the next image pickup operation.

When the action flag is not set in step S127, the system control circuit 50 repeats steps S126 and S127 until the image pickup start switch SW2 is turned off.

When the image pickup start switch SW2 is off in step S126, the process proceeds to step S128 to determine whether or not the image pickup setup switch is on. When it is on, the process returns to step S122. On the other hand, when it is off, the process returns to step S103.

Figure 4:
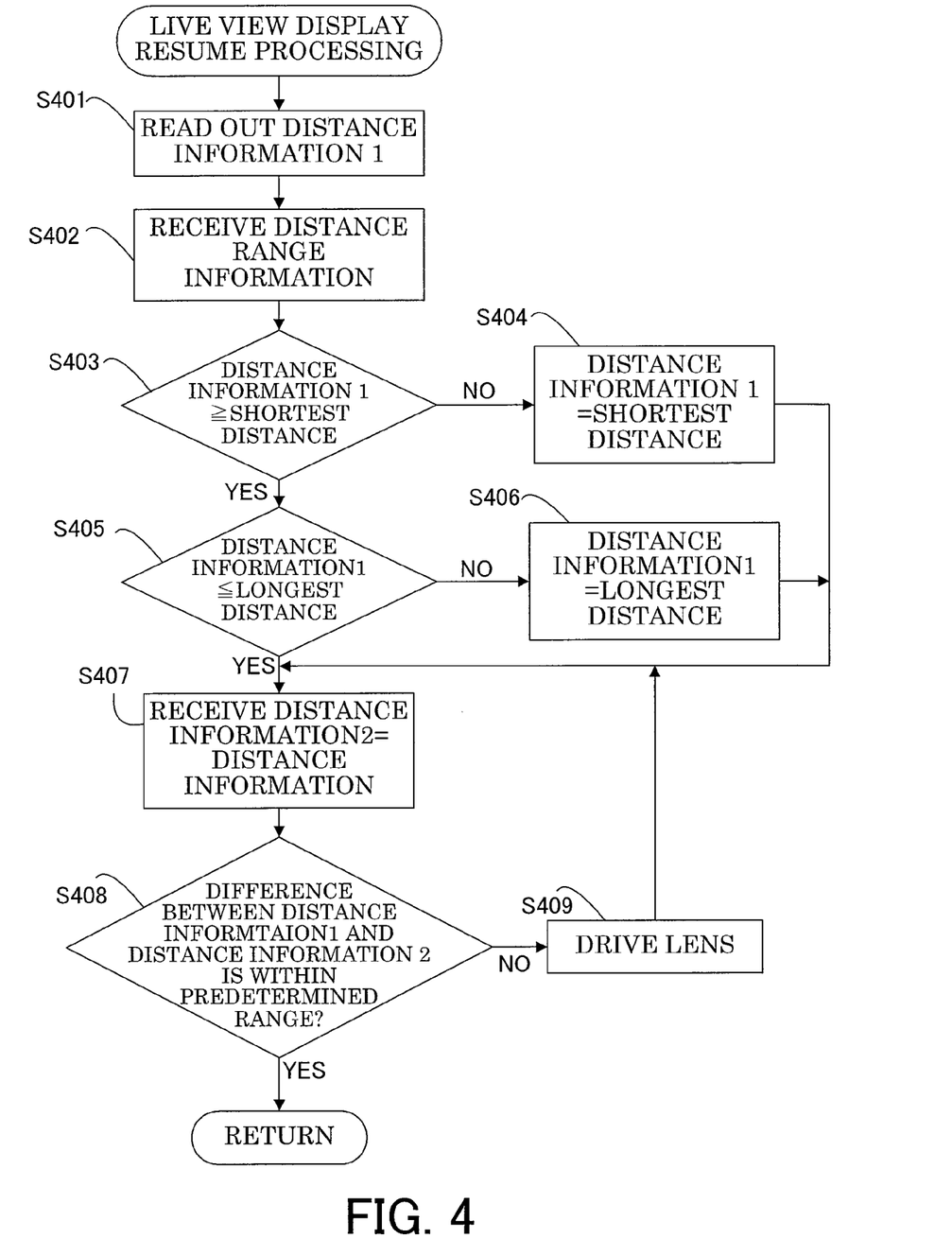
FIG. 4 is a flowchart showing a resuming process of a live view display in the image pickup apparatus of the embodiment.

Next, the resume process of the live view display performed in step S115 will be described with reference to FIG. 4. As described above, after the interchangeable lens (hereinafter, referred to as a first interchangeable lens) 220 that has been previously mounted is removed, the process in which other interchangeable lens (hereinafter, referred to as a second interchangeable lens) 220 is newly mounted is performed.

First, the system control circuit 50 reads out the 'distance information 1' that has been received from the first interchangeable lens 220 and then stored and retained in the internal memory or the memory 52 in step S121 from the memory in step S401. The system control circuit 50, therefore, obtains the object distance information immediately before the first interchangeable lens 220 is removed.

Next, in step S402, the system control circuit 50 performs communication with the second interchangeable lens 220 and receives information of the object distance range (shortest object distance and longest object distance) of the second interchangeable lens 220.

Next, in step S403, the system control circuit 50 determines whether or not the object distance immediately before the first interchangeable lens 220 is removed corresponding to the 'distance information 1' that has been read out is longer than the shortest object distance of the second interchangeable lens 220. When the object distance is shorter than the shortest object distance, the process proceeds to step S404 and set the shortest object distance of the second interchangeable lens 220 in the 'distance information 1', and proceeds to step S407.

When the object distance immediately before the first interchangeable lens 220 is removed corresponding to the 'distance information 1' is longer than the shortest object distance of the second interchangeable lens 220, the process proceeds to step S405.

The system control unit 50 determines whether or not the object distance immediately before the first interchangeable lens 220 is removed corresponding to 'distance information 1' is shorter than the longest object distance of the second interchangeable lens 220 in step S405. When the object distance is longer than the longest object distance, the process proceeds to step S406, and set the longest object distance of the second interchangeable lens 220 in the 'distance information 1' and proceeds to step S407.

That is, when the object distance immediately before the first interchangeable lens 220 is removed is out of a range of the object distance of the second interchangeable lens 220, the 'distance information 1' is set to a shortest value or a longest value within a range of the object distance of the second interchangeable lens 220.

When the object distance immediately before the first interchangeable lens 220 is removed corresponding to the 'distance information 1' is shorter than the longest object distance of the second interchangeable lens 220 in step S405, the process proceeds to step S407. The system control circuit 50 receives the current object distance information from the second interchangeable lens 220 and stores the 'distance information 2' in the internal memory in step S407.

Then, the system control circuit 50 compares the 'distance information 1' to the 'distance information 2' to determine whether the difference is within a predetermined range in step S408. If the difference between the 'distance information 1' and the 'distance information 2' is within the predetermined range, the process returns. On the other hand, the difference between the 'distance information 1' and the 'distance information 2' is out of the predetermined range, the process proceeds to step S409.

Then, the system control circuit 50 sends an amount of the difference between the 'distance information 1' and the 'distance information 2' to the second interchangeable lens 220. With this process, the system control circuit 50 makes the lens operate in a direction of the lens position (driving the zoom lens and the focus lens) corresponding to the object distance at which the first interchangeable lens 220 is in focus. Then, the lens position of the second interchangeable lens 220 can be moved at a position corresponding to or near the object distance at which the first interchangeable lens 220 is in focus.

After such a lens operation is completed, when the image pickup setup switch SW1 is turned on in step S119, focus control by the contrast detection method is performed. When it is performed, the focus control starts at a position or near the object distance (object) at which the first interchangeable lens 220 is in focus. Therefore, compared to a case where the focus control is performed by the contrast detection method from the first (from the position far from the in-focus position), the same object can be in focus in a short time.

Further, after the second interchangeable lens 220 is mounted, the live view display in focus can be rapidly resumed.

Each embodiment described above is just a typical example, and various modifications are possible for each embodiment of the present invention in the practice of the invention.

For example, in the present embodiment, a case when the object distance itself is sent to the camera is described as the information on the object distance, the information on the positions of the focus lens and the zoom lens may be sent as the information on the object distance. In this case, an initial communication between the interchangeable lens and the camera and the like, the object distance in the camera can be obtained by sending the data of an arithmetic expression for calculating the object distance from the position of each lens and the table data of the object distance.

Further, in the embodiment described above, the image pickup apparatus configured to perform the focus control by the contrast detection method is described. However, as another embodiment of the present invention, the focus control by the phase difference detection method may be performed. For example, when it is likely to take some time to get the object in focus by the focus control by the phase difference detection method depending on a case of the object, the time necessary for getting the object in focus can be reduced.

Furthermore, in the embodiment described above, although the single-lens reflex digital camera is described, the embodiment of the present invention includes other image pickup apparatuses such as a video camera.

According to each embodiment described above, since the information on the object distance of the interchangeable lens previously mounted is stored and retained, the lens operations using the information is possible after the lens is changed. Thus, the object with the same distance can be in focus in a short time even if the lenses are changed.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-150815, filed on Jun. 6, 2007, which is hereby incorporated by reference herein in its entirety.

What is claimed is:

1. An image pickup apparatus on which an interchangeable lens is detachably mounted comprising:
   a memory that stores information on an object distance obtained from a first interchangeable lens mounted on the image pickup apparatus;
   a memory controller that retains the information on the object distance in the memory also after the first interchangeable lens is removed from the image pickup apparatus;
   a focus controller that makes a second interchangeable lens operate in a direction of a lens position corresponding to the information on the object distance of the first interchangeable lens retained in the memory when the second interchangeable lens is mounted on the image pickup apparatus in a case where the information on the object distance of the first interchangeable lens is retained in the memory; and
   an image pickup device that photoelectrically converts an object image formed by one of the first and the second interchangeable lenses,
   wherein the focus controller performs a focus control on one of the first and the second interchangeable lenses based on a focus evaluation signal showing a contrast status of an image obtained using the image pickup device, and
   wherein the focus controller performs the focus control after making the second interchangeable lens operate in the direction of the lens position corresponding to the information on the object distance of the first interchangeable lens retained in the memory when the second interchangeable lens is mounted on the image pickup apparatus in the case where the information on the object distance of the first interchangeable lens is retained in the memory.

2. An image pickup apparatus according to claim 1, further comprising:
   a display that displays an image obtained using the image pickup device; and
   a display controller that stops displaying the image when the first interchangeable lens is removed from the image pickup apparatus while the image is displayed on the display, and that, after the second interchangeable lens is mounted on the image pickup apparatus, resumes displaying the image after the second interchangeable lens operates in the direction of the lens position corresponding to the information on the object distance.

3. An interchangeable lens detachably mounted on an image pickup apparatus, the image pickup apparatus comprising a memory that stores information on an object distance obtained from a first interchangeable lens mounted on the image pickup apparatus, a memory controller that retains the information on the object distance in the memory also after the first interchangeable lens is removed from the image pickup apparatus, a focus controller that makes a second interchangeable lens operate in a direction of a lens position corresponding to the information on the object distance of the first interchangeable lens retained in the memory when the second interchangeable lens is mounted on the image pickup apparatus in a case where the information on the object distance of the first interchangeable lens is retained in the memory, and an image pickup device that photoelectrically converts an object image formed by one of the first and the second interchangeable lenses, wherein the focus controller performs a focus control on one of the first and the second interchangeable lenses based on a focus evaluation signal showing a contrast status of an image obtained using the image pickup device, and the focus controller performs the focus control after making the second interchangeable lens operate in the direction of the lens position corresponding to the information on the object distance of the first interchangeable lens retained in the memory when the second interchangeable lens is mounted on the image pickup apparatus in the case where the information on the object distance of the first interchangeable lens is retained in the memory, the interchangeable lens comprising:

an information generator that detects a lens position to generate information on the object distance based on the detected lens position,     wherein the interchangeable lens outputs the information on the object distance to the image pickup apparatus.

4. A method for controlling an image pickup apparatus on which an interchangeable lens is detachably mounted comprising steps of:

storing information on an object distance of a first interchangeable lens mounted thereon in a memory;

retaining the information on the object distance in the memory also after the first interchangeable lens is removed from the image pickup apparatus;

making a second interchangeable lens operate in a direction of a lens position corresponding to the information on the object distance of the first interchangeable lens retained in the memory by a focus controller when the second interchangeable lens is mounted on the image pickup apparatus in a case where the information on the object distance of the first interchangeable lens is retained in the memory; and photoelectrically converting an object image formed by one of the first and the second interchangeable lenses, wherein the focus controller performs a focus control on one of the first and the second interchangeable lenses based on a focus evaluation signal showing a contrast status of an image obtained using the image pickup device, and wherein the focus controller performs the focus control after making the second interchangeable lens operate in the direction of the lens position corresponding to the information on the object distance of the first interchangeable lens retained in the memory when the second interchangeable lens is mounted on the image pickup apparatus in the case where the information on the object distance of the first interchangeable lens is retained in the memory.

* * * * *